United States Patent [19]

Pohl

[11] Patent Number: 5,325,754
[45] Date of Patent: Jul. 5, 1994

[54] APPARATUS FOR CUTTING PROFILE STRIPS FORMED OF RUBBER MIXTURES

[75] Inventor: Hans-Joachim Pohl, Hanover, Fed. Rep. of Germany

[73] Assignee: Paul Troester Maschinenfabrik, Hanover, Fed. Rep. of Germany

[21] Appl. No.: 106,192

[22] Filed: Aug. 12, 1993

Related U.S. Application Data

[63] Continuation-in-part of Ser. No. 888,038, May 22, 1992, abandoned.

[30] Foreign Application Priority Data

May 24, 1991 [DE] Fed. Rep. of Germany ....... 4116971

[51] Int. Cl.$^5$ ............................................... B26D 1/18
[52] U.S. Cl. .................................. 83/488; 83/506; 83/563; 83/564
[58] Field of Search ................. 83/508, 614, 563, 564, 83/488, 501, 240, 248; 74/89

[56] References Cited

U.S. PATENT DOCUMENTS

| | | | |
|---|---|---|---|
| 3,072,004 | 1/1963 | Jenkins | 83/488 X |
| 3,730,032 | 5/1973 | Marckx et al. | 83/564 X |
| 3,750,513 | 8/1973 | Cromeens | 83/499 X |
| 3,848,501 | 11/1974 | Kuts | 83/508 X |
| 3,924,503 | 12/1975 | Kuts | 83/488 |
| 3,989,565 | 11/1976 | Appleby et al. | 83/508 X |
| 4,253,342 | 3/1981 | Uhing | 74/89 |
| 4,403,522 | 9/1983 | Kumpar | 74/89 |
| 4,450,731 | 5/1984 | Wardley | 74/89 X |
| 4,614,124 | 9/1986 | Uhing | 74/89 |

Primary Examiner—Rinaldi Rada
Attorney, Agent, or Firm—Robert E. Burns; Emmanuel J. Lobato

[57] ABSTRACT

Apparatus for cutting profile strips of rubber mixture produced by extrusion and/or calendering and transported to the cutting apparatus by a conveyor which is intermittently stopped for making a cut has a motor driven rotating knife which is moved transversely of the profile strip by a roll-ring drive and is raised to a height above the profile strip for return movement of the knife. In one embodiment, the knife, its driving motor and the mechanism for moving the knife transversely of the profile strip are mounted on a seesaw which is pivoted on horizontal axis and is moved pivotally by a pneumatic servo-motor to raise and lower the knife. In other embodiments the knife and transverse movement mechanism are mounted on a movable carriage, which is raised and lowered by a pneumatic servo motor while the motor for driving the knife in rotation is mounted on the frame of the apparatus and connected to the shaft of the knife by a flexible or telescopic connecting shaft. The carriage runs on a track or is supported by a parallelogram linkage.

7 Claims, 7 Drawing Sheets

APPARATUS FOR CUTTING PROFILE STRIPS FORMED OF RUBBER MIXTURES

This is a continuation-in-part of application Ser. No. 07/888,038, filed May 22, 1992.

FIELD OF INVENTION

The invention relates to apparatus for cutting into sections a profile strip of a rubber mixture which is formed by extrusion and/or calendering and which is transported by a conveyer which is intermittently stopped for the cutting operation. The apparatus comprises a knife in the form of a circular disk which is mounted on a knife shaft and driven by a motor through a flexible shaft and a transverse motion mechanism for moving the knife back and forth between two predetermined end positions and for raising the knife to a higher position during the return stroke than during the cutting stroke.

BACKGROUND OF THE INVENTION

In the production of single and multiple layer rubber strips for the manufacture of tires, for example protector or tire sidewall profiles, not only high quality but also high frequency of cuts per unit time must be obtained in order to meet the production requirements of tire production. The cut quality is of particular importance in the production of radial tires and the cut frequency is necessary in order to obtain economical production.

Cutting apparatus according to the state of the art, almost without exception, uses a fast rotating circular knife which during the cut must be lubricated with steam or by a liquid vapor. There are embodiments in which the circular knife is mounted directly on the shaft of the driving motor which then must be moved with the knife and protection devices transversely of the profile strip. In order to make a cut on a moving profile strip, such cutting machine had a carriage which through coupling to the transport device during the cutting operation moved synchronously with the rubber profile strip to be cut. With higher production rates, this cutting apparatus soon became inoperable because the return movement of the carriage with the cutting apparatus could not be accomplished in the short time period.

The further development of the cutting apparatus was to the effect that the rubber strip to be cut would be stopped for a short period of time for the cutting operation, which required braking and accelerating mechanism for the transport element and raised serious problems of precision which, however, could be solved. However, it showed the limits of performance in the transverse movement of the rotating cutting knife, since because of the relatively great mass, in particular of the knife motor, the speed of movement could not be as high as required for efficient operation, in particular the required cutting frequency desired for the extrusion apparatus. However, not only the weight of the driving motor for the knife set limits on increase in speed of production, but also the transport mechanism, for the most part rotating screw spindles, which were driven by brake motors and which, on account of the frequent acceleration and braking, were subject to serious abrasion. The starting and braking operations of the transverse movement involved strong forces which affect the entire cutting machine and are not endurable.

It has been sought to carry out the cutting operation in both directions by making one cut from left to right and the next cut from right to left. However, this gave dissimilar cut pictures which led to problems in the packaging of tires. It is, hence necessary, in the return movement of the knife, to raise the knife together with the knife holder over the profile strip to be cut at the end of a cut, then draw it back over the profile strip and then, for carrying out the next cut, again lower the knife, as is described for example in DE-OPS 11 86 209.

The apparatus known through this publication has, as the cross feed mechanism, a carriage which is displacable on guide rails and is shoved back and forth by a chain between two guide wheels. The carriage has a cradle with bearings for the knife shaft. The movement of the cradle is derived from a rocker arm which is linked to the chain and the carriage and which transmits the chain movement to the carriage. On account of the inexact cradle height adjustment, there are additionally provided pivot adjustments. The driving motor is connected wit the knife shaft by a flexible shaft. With this arrangement an exact cut is not possible. The nonuniformities which occur lie in somewhat like positions and hence largely compensate one another, but this is not sufficient for modern requirements of tire quality.

The use of pneumatic thrust cylinders instead of threaded spindles leads to an almost abrasion free method of operation but does not achieve the desired result, since, because of the short time of the entire operation, the thrust of acceleration and braking cannot be sufficiently damped. Moreover, these pneumatic transport devices have the objection that they cannot be brought to a uniform transverse velocity during the cut, since at the moment of cutting, the resistance-responsive forward velocity is decreased. This leads to unclean cuts. Hydraulic drives for the transverse movement of the knife are prohibited, not only by reason of cost, but also because of the hard thrust which occurs with hydraulic mechanism in fast acceleration and braking.

SUMMARY OF THE INVENTION

The present invention avoids the disadvantages of the state of the art. It is the object of the invention to increase, in a simple manner, the speed of operation of the cutting apparatus in making precise cuts.

The cutting apparatus in accordance with the invention attains these objectives by providing apparatus in which the knife shaft, its bearings and the transverse movement mechanism are arranged on a common displacable or swingable mounting support, the transverse movement mechanism is a roll-ring drive, the drive shaft for the transverse movement mechanism is rotatable in bearings fast on the mounting support, the knife shaft is rotatable, but not axially slidably in or on a bearing housing mounted on the housing of the transverse movement mechanism and between the knife shaft and the shaft of the motor for driving the knife, there is arranged a variable length connecting shaft, a tooth belt drive or other flexible, but positive torque transmitting device.

With this apparatus, exact uniform cuts without nonuniformity are attained. This is achieved, on the one hand, in that the knife engages a strip to be cut without loss of speed of rotation and severs a strip with uniform rotation and cutting speed and that, on the other hand, the fast bearing mount of the knife shaft on the drive housing of the transverse movement mechanism prevents deflection of the knife shaft, in particular at the beginning of a cut. In this manner, the heavy drive motor for the knife does not move with the knife shaft so that at the reversal points of the transverse movement of the knife, there is only a relatively small mass which must be braked and again accelerated. The use of the telescopic drive shaft for the knife provides a connection of the required torsional strength between the driving motor and the knife which is necessary to keep the rotational speed of the knife constant at the beginning of the cut. Also, the selection of a roll-ring drive leads to a reduction of the mass which is required to be moved. With the roll-ring drive, only the housing for the three roller bearings, on which the bearing for the knife shaft is mounted, has to be moved. In this manner the mass that has to be transported in the transverse movement is so limited that the braking and re-acceleration of the mass requires only a very short period of time. In this manner, a high cutting frequency can be attained.

It is advantageous when reversing detents for the roll-ring drive are adjustably mounted at predetermined positions on the mounting support.

This cutting apparatus can be produced in two embodiments.

One embodiment is characterized in that the mechanism for transverse movement and the motor are arranged on a seesaw which is pivotal about a horizontal axis. With this tillable seesaw, the axis can be positioned so that it passes through the center of gravity of the seesaw. In this manner, the heavy driving motor for the rotating knife can be accommodated on the tillable seesaw without its mass influencing the time required for the acceleration and braking of the seesaw.

This construction provides a very simple solution when the knife shaft, the connecting shaft and the shaft of the motor, lie in a common plane. At the same time, abrasion is hereby still further reduced.

The other preferred embodiment of the cutting apparatus consists therein that the knife shaft, its bearings and the transverse movement mechanism are arranged on a common carrier with which the knife is movable parallel to itself from its cutting region of the strip to be cut. With this embodiment, the heavy driving motor for the knife is fast on the machine frame while the transport mechanism with its motor and the bearings for the knife shaft are mounted on a carriage or a sled which runs or slides on guide rails. Movement is preferable effected by a pneumatic cylinder.

It is advantageous when the carrier is movable in a plane parallel to the knife or perpendicular to the knife shaft from the cutting region of the strip to be cut.

Another possibility, is that the guide rail is arranged vertically.

In this kind of embodiment, it is advantageous when detents for reversing the roll-ring drive are arranged in predetermined selected positions on the support. Instead of guide rails, a parallel linkage mechanism can serve for movement of the carrier.

BRIEF DESCRIPTION OF DRAWINGS

The essence of the invention will be more fully understood from the following description of the preferred embodiments shown schematically in the accompanying drawings in which.

DESCRIPTION OF PREFERRED EMBODIMENTS

The cutting apparatus has a machine frame 1 in which a conveyor belt 2 transports a profile strip 3 which is coming from a cooling device (not shown) and which is to be cut into precise lengths. The cutting is accomplished by a rotating circular knife 4 which engages a groove in a ledge 5 serving as a cutting support. This supplied profile strip 3 is momentarily stopped for the cut by stopping the conveyor belt 2 and stopping a pressure roller 6. The cut sections 7 of the roller strip are transported from the cutting knife by a conveyor belt 8.

The knife 4 is secured on a knife shaft 9 which is rotatably supported by a bearing housing 10 which is mounted on the transverse drive housing 11. This transverse drive housing 11 is displacable to and fro on the drive shaft 12 by the transverse motion mechanism housed in the housing 11. Reversing abutments 13 determine the end points of the reversal of movement of the transverse drive housing 11 on the drive shaft 12. This drive shaft 12 is rotable supported in bearings 14 and is driven by a motor 15.

The drive of the rotating knife 4 is effected by a motor 16 through an articulated shaft 17, which is telescopic. All of these machine parts are mounted on a seesaw 18. The motors 15 and 16 are mounted fast on the seesaw 18 as are also the bearings 14 for the drive shaft 12. Also a guide rail 19 is mounted fast on the seesaw 18. The transverse drive housing 11 is movable along this guide rail 19. The guide rail 19 serves to guide the transverse drive housing 11 back and forth without rotation. Two reversing abutments or detents 13 are mounted on the seesaw 18 in fixed, but adjustable, positions spaced from one another. They determine the length of stroke of the transverse drive housing 11. For the cutting of wide protector strips, these reversing detents 13 are spaced further apart from one another than for the cutting of small sidewall strips. The seesaw 18 is pivotal about a horizontal axis 20. It is moved pivotally about its axis between a cutting position and a return position by means of a pneumatic servomotor drive 21 and in the end positions is held by abutments 22, 23, of which the abutment 22 determines the cutting position and the abutment 23 determines the return position.

The transverse motion mechanism for moving the transverse drive housing 11 back and forth along the drive shaft 12 is a commercially available rolling ring drive, for example, a Uhing Linear Drive sold by Joachim Uhing KG GmbH & Co., Postfach 4206 D-2306, Kiel 1, Germany. Rolling ring drives are friction drives which convert the constant speed rotation of a plain round shaft into reciprocating motion. They operate like nuts on a threaded shaft. However, the pitch, left-hand and right hand, is capable of fine adjustment or can be set to zero.

Figure 1:
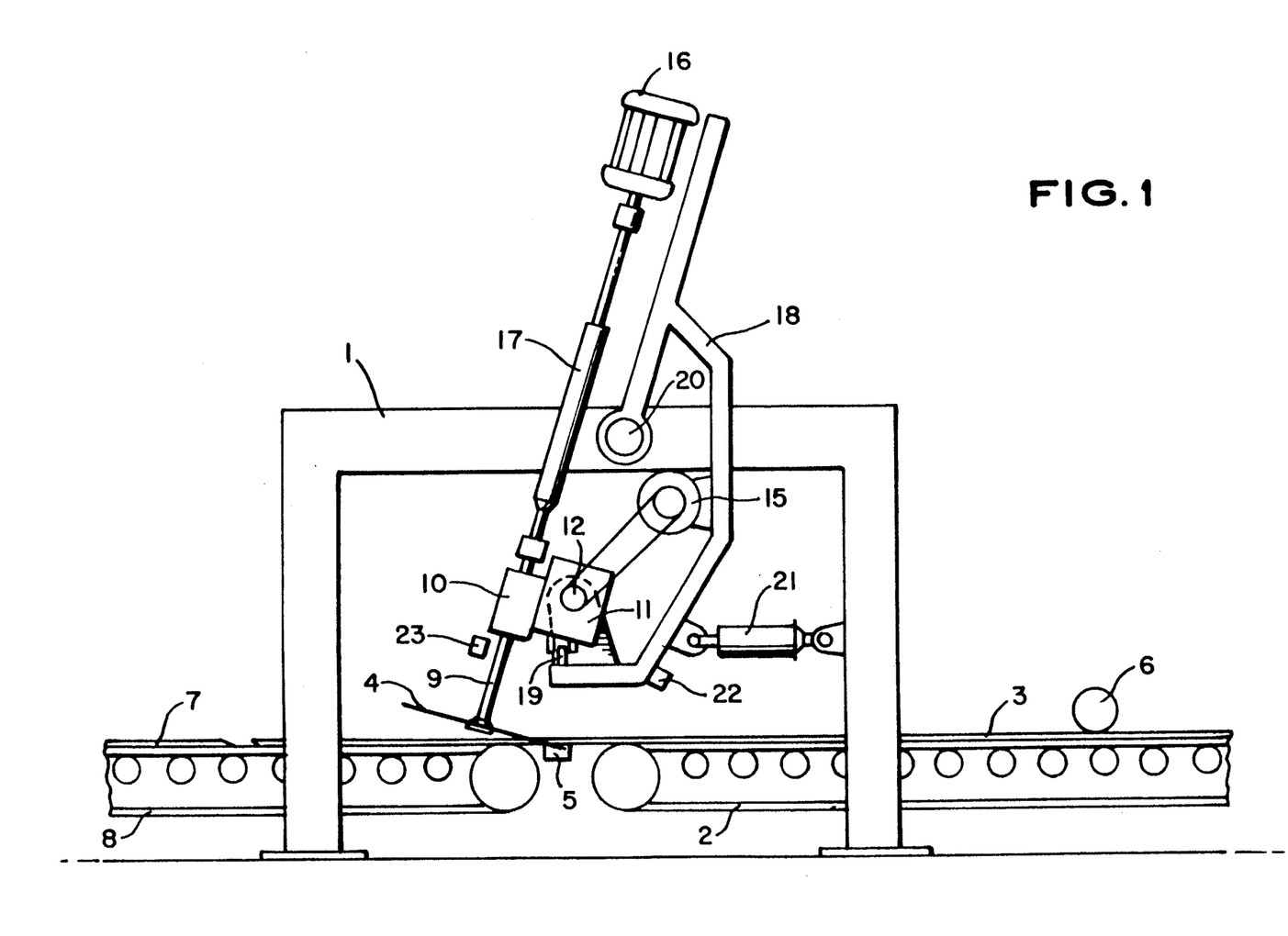
FIG. 1 is a side elevation of the cutting apparatus during a cut.
Figure 2:
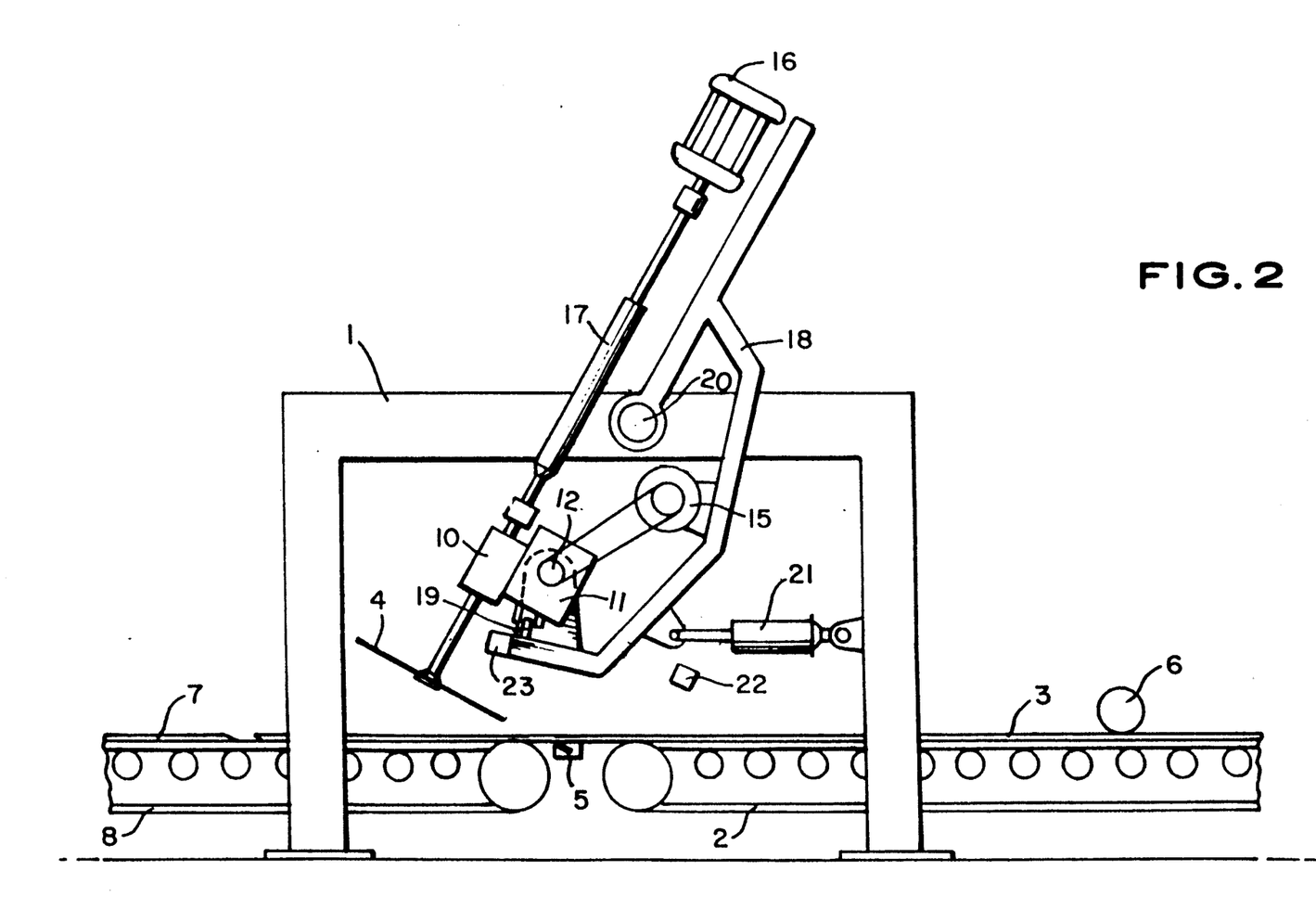
FIG. 2 is a side elevation of the apparatus during return movement of the knife.
Figures 3, 5:
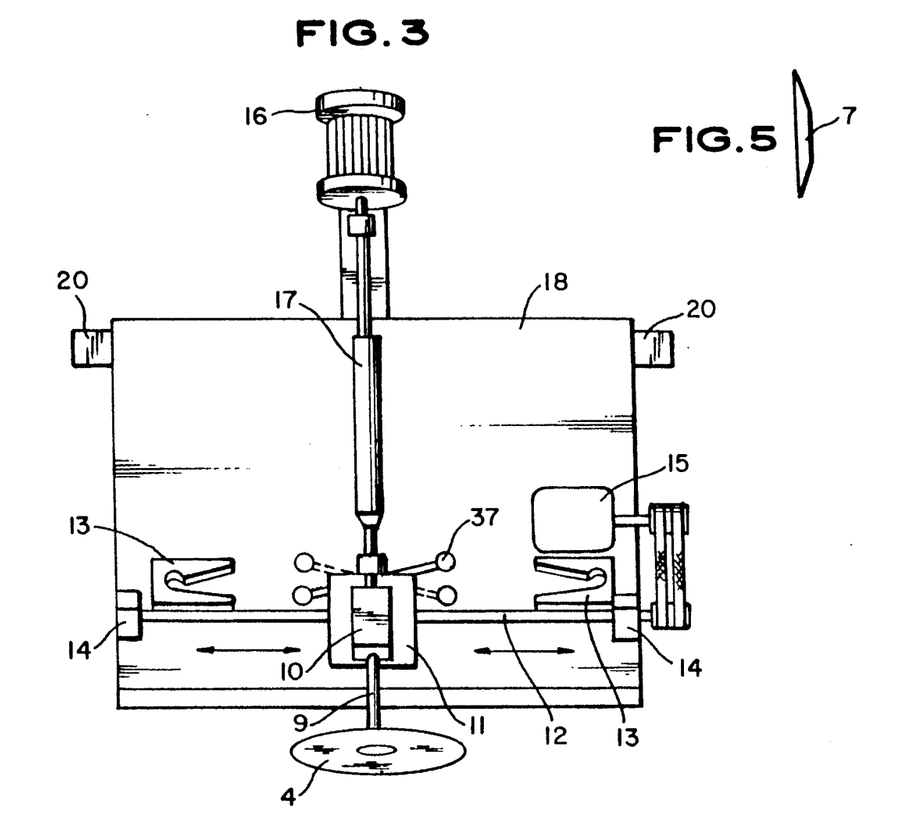
FIG. 3 is a front elevation of the apparatus.
FIG. 5 is an end view of the cut strip.
Figure 4:
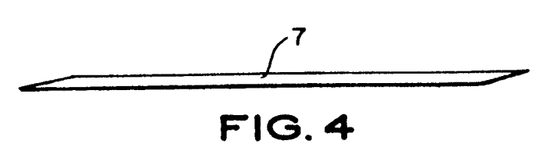
FIG. 4 is a side view of the cut strip.
Figure 6:
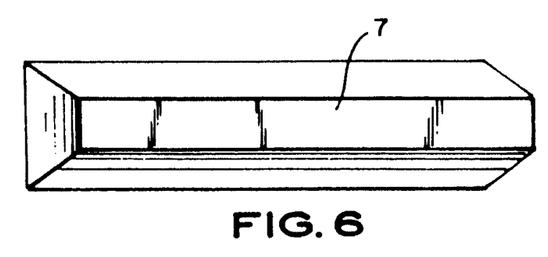
FIG. 6 is a top perspective view of the cut strip.
Figure 7:
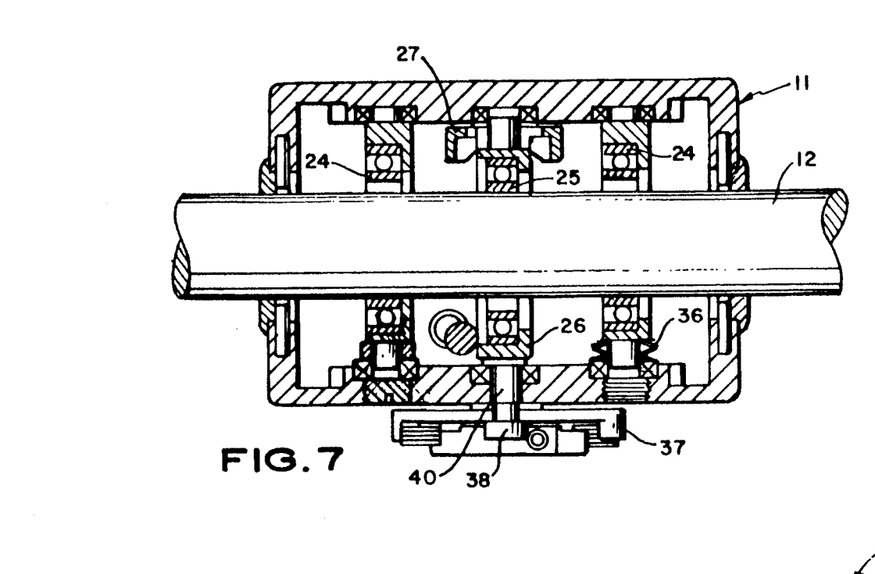
FIG. 7 is a longitudinal section through the roll ring drive.
Figure 8:
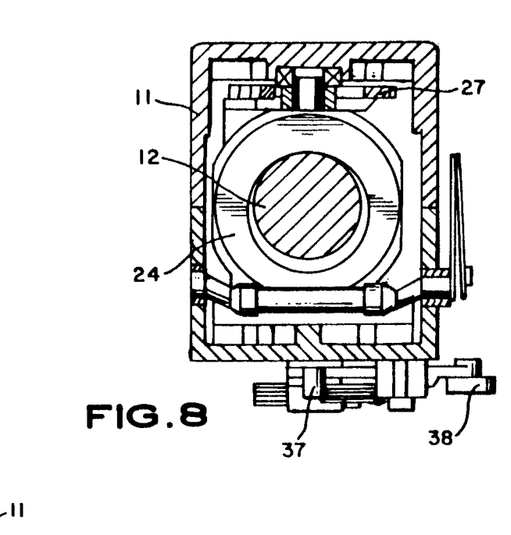
FIG. 8 is a cross section of the roll ring drive.
Figure 9:
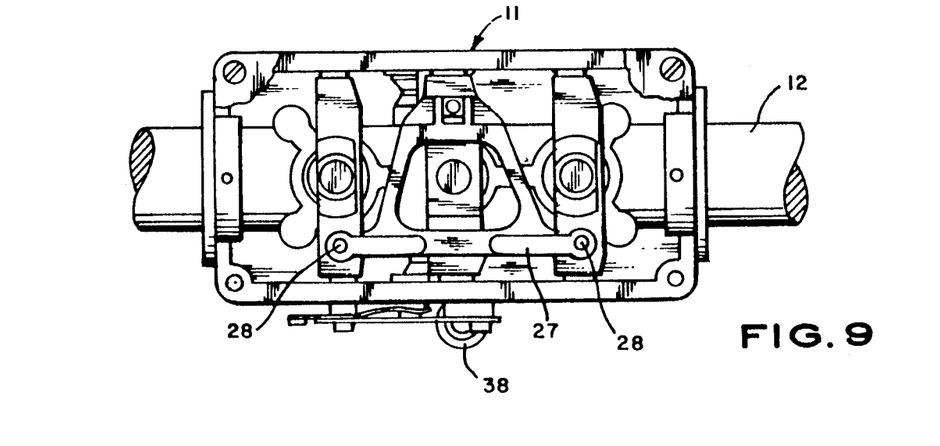
FIG. 9 is a top plan view of the roll ring drive.

This effect is achieved by using ball bearing based rolling rings which are designed to pivot about the shaft with their specially crowning running surfaces being pressed against the shaft as it rotates. In the transverse drive housing 11, as illustrated in FIGS. 7, 8 and 8, there are two end ball bearings 24 and a central ball bearing 25 disposed between the two end ball bearings 24. The ball bearings have an inner diameter which is larger than the diameter of the drive shaft 12 and are pressed against the drive shaft by spring washers 36 which act on one roller bearing and thereby press all of the roller bearings against the shaft 12. As see in FIG. 7, the two end ball bearings 24 are pressed against one side of the shaft 12 while the central ball bearing 25 is pressed against the diametrically opposite side of the shaft 12.

The ball bearings 24 and 25 are held in pivoted holders 26 which are pivotally supported at opposite sides of the housing 11 with pivot axes diametrical of shaft 12. Moreover, the pivoted holders 26 of the ball bearings are interconnected with one another by a coupling yoke 27 which engages pins 28 on the pivoted holders of end ball bearings 24 and a pin 36 on the pivoted holder of the central ball bearing 25.

Moreover, the pivoted holder 26 of the central ball bearing 25 has a central shaft 40 which extends outside the housing 11 and carries a double arm reversing lever 37 and a limit stop reversing lever 38 which cooperate respectively with reversing abutments 13 and adjusting stops 39 in effecting reversal of movement of the transverse drive housing 11 along the drive shaft 12 at end of a stroke.

Figure 13:
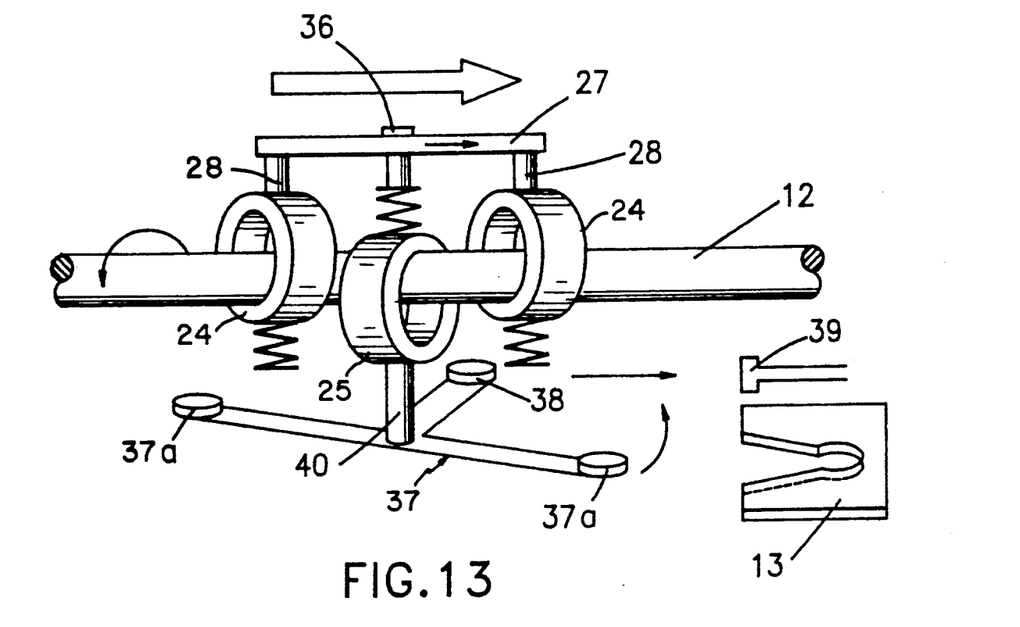
FIG. 13 is a schematic perspective view illustrating reversal of the transverse motion mechanism at one limit of its travel.

Reversal of movement of the transverse drive housing 11 along the drive shaft 12 is effected in the following manner. As the transverse drive housing 11 reaches the limit of its movement in one direction, a disc 37a on an end of a double arm reversing lever 37 on the shaft 40 of the pivoted holder 26 of the central ball bearing 25 engages in a V-shape slot in a reversing abutment 13 secured in a suitable position on the apparatus and the limit stop reversing lever 38 engages a corresponding adjusting stop 39 (see FIG. 13). The shaft 40 is thereby turned in a reverse direction so that the central ball bearing 25 is reversed in its position on the shaft 12. Moveover, through the coupling yoke 27, the positions of the two end ball bearings 24 are likewise reversed. The transverse drive housing is thereby driven in a verse direction along the drive shaft 12.

Figure 14:
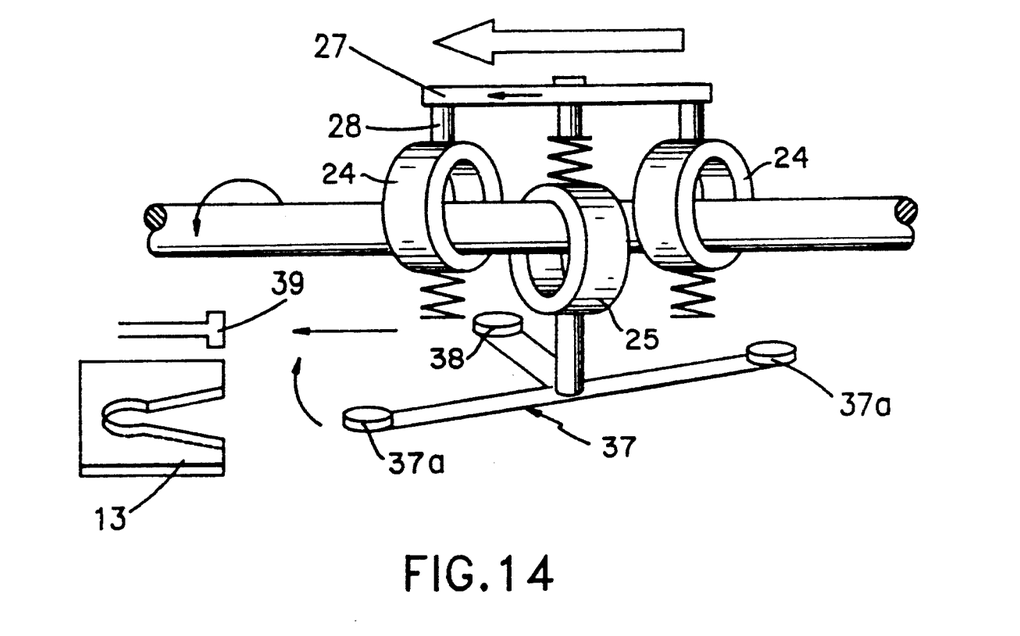
FIG. 14 is a schematic perspective view illustrating reversal of the traverse motion mechanism at another limit of its travel.

Movement of the transverse drive shaft housing along the drive shaft 12 continues in the new direction until the reversing lever 37 and the limit stop reversing lever 38 on the shaft 40 reach the reversing abutment 13 and the corresponding adjusting stop 39 positioned on the apparatus for the opposite limit of movement of the drive shaft housing. The reversing lever 37 and the limit stop reversing lever 38 are thereby engaging by the second reversing abutment 13 and corresponding adjusting stop 39 in like manner to reverse the position of the central ball bearing 25 and, through the coupling yoke 27, likewise reverse the end bearings 24.

Figure 10:
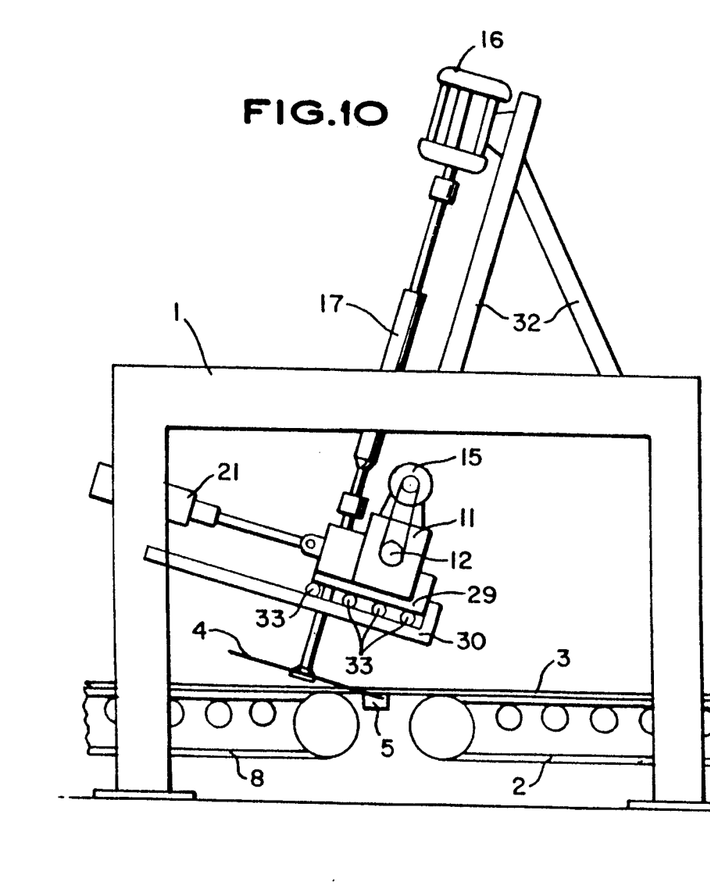
FIG. 10 is a side elevation of a second embodiment of the invention with a moveable carrier for the transverse movement mechanism which is formed as a carriage which is displacable on guide rails arranged in an inclined position on the machine frame.

In the embodiment of FIG. 10, the driving motor 16 of the knife shaft 9, is mounted fast on the support 32 on the machine frame 1. The transverse feed mechanism in the form of a roll ring drive with transverse drive housing 11, drive shaft 12 and the motor 15 are mounted on a carrier 29 which is shown as a carriage with wheels running on guide rails 30 in a direction indicated by the double arrow with the help of servo motor 21 which is formed as a pneumatic piston-cylinder-unit. At the reversal points of the transverse movement in which the knife remains outside the strop to be cut for a short period, the movement of the carriage 29 is effected by the servo motor 21.

Figure 11:
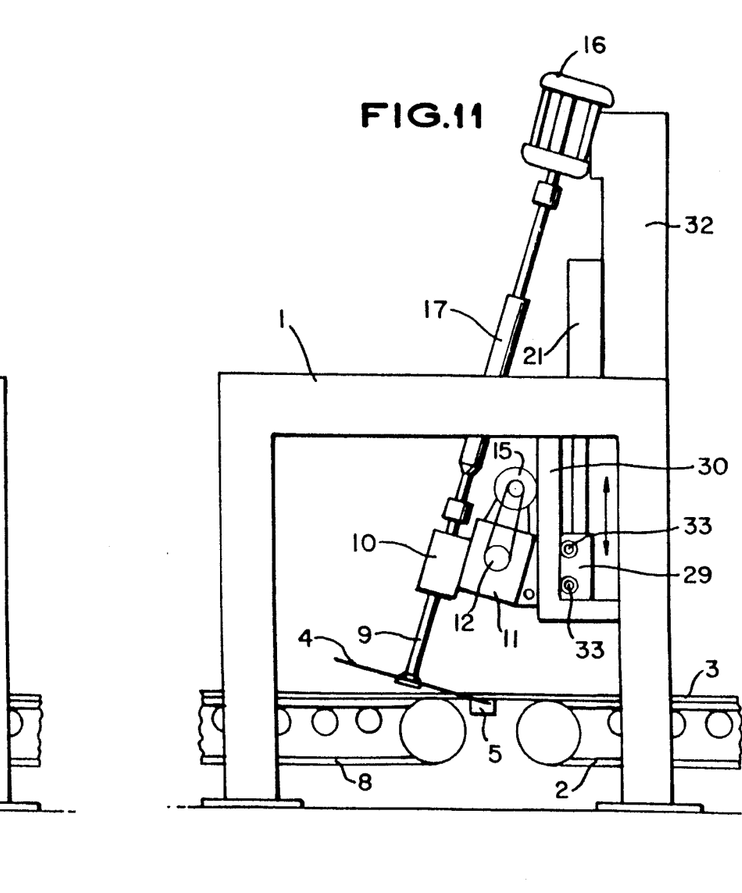
FIG. 11 is side elevation of a further embodiment of the invention in which the carrier for the transverse motion mechanism is displacable on vertical guide rails.

In the embodiment of FIG. 11, the carrier 29 is formed as a slide which has wheels 33 running on the vertically arranged guide rails 30 and is moved by means of a servo motor 21 in order to raise the knife 4 to its upper position during its return movement without contacting the strip 3 to be cut. Also here the parts 10, 11, and 12 of the transverse movement mechanism are mounted on the slide serving as the carrier 29. The bearing housing 10 for the knife shaft 9 is mounted fast on the transverse drive housing 11 of the transverse movement mechanisms.

Figure 12:
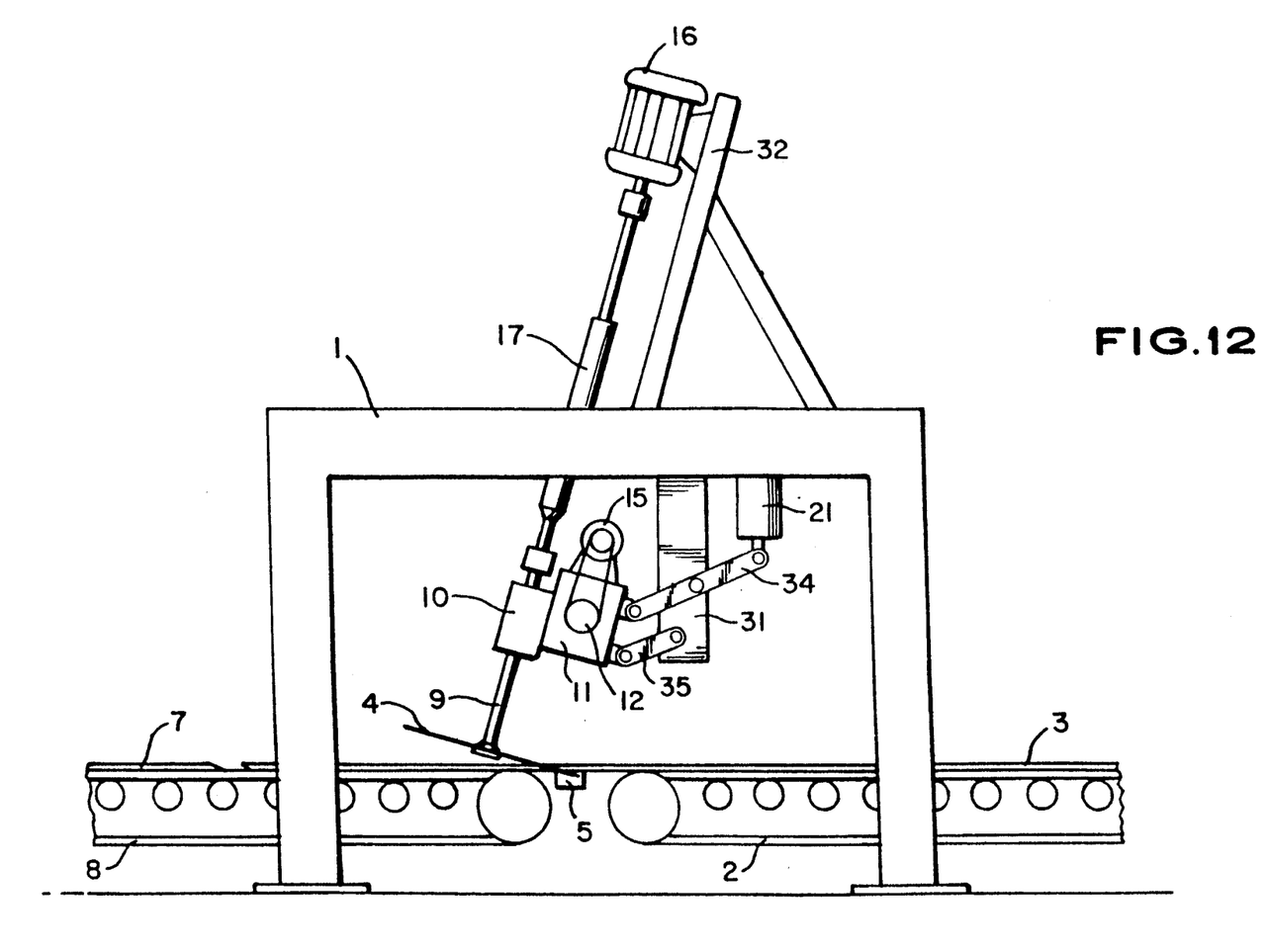
FIG. 12 is a side elevation of a further embodiment of the invention in which the carrier for the transverse motion mechanism is adjustable in height by a parallelogram linkage.

In the embodiment of FIG. 12, the transverse movement mechanism 10, 11, 12 is supported by links 31 of a parallel motion mechanism, of which the upper link 34 is double arm link of which one arm is connected to the servo motor 21 while the lower link 35 is a single arm link.

What I claim is:

1. Cutting apparatus for cutting into sections a profile strip of rubber mixture which is transported by a conveyor which is stopped intermittently for making a cut, said apparatus comprising a frame, a circular knife secured on a knife shaft, bearing means for rotatably supporting said knife shaft and knife, supporting means for supporting said bearing means on said frame, transverse motion means for moving said bearing means, knife shaft and knife transversely of said profile strip, height positioning means for positioning said bearing means, knife shaft and knife at a lower height during movement of said bearing means, knife shaft and knife transversely of said strip in one direction for effecting a cut of said strip and for positioning said bearing means, knife shaft and knife at a higher height during return movement of said bearing means, knife shaft and knife in an opposite direction,    a motor mounted on said frame and having a motor shaft, and    a telescopic connecting shaft connecting said motor shaft with said knife shaft for driving said knife shaft and knife in rotation while permitting relative movement between said motor and said bearing means, knife shaft and knife.

2. Apparatus according to claim 1, comprising an inclined track, a carriage supported for movement on said inclined track, said bearing means, knife shaft, knife and transverse motion means being mounted on said carriage and said height positioning means comprising means for moving said carriage on said inclined track between a lower height and a higher height.

3. Apparatus according to claim 1, in which said bearing means is mounted on said transverse motion means and in which a parallel linkage mechanism comprising two parallel links between said frame and said transverse motion means supports said transverse motion means for movement between a lower height and a higher height, and in which said height positioning means comprises a pneumatic servo motor connected with one of said links.

4. Apparatus according to claim 1, comprising a carrier on which said transverse motion means and bearing means are mounted and means on said frame for guiding said carriage for movement in an up-and-down direction, said height positioning means comprising means for moving said carriage up and down.

5. Apparatus according to claim 4, in which said height positioning means comprises a pneumatic servo motor connected between said frame and said carriage.

6. Cutting apparatus for cutting into sections a profile strip of rubber mixture which is transported by a conveyor which is stopped intermittently for making a cut, said apparatus comprising a main frame, a seesaw frame pivotally mounted on said main frame for tilting about a horizontal axis and having an upper end portion and a lower end portion, a circular knife fixed on a knife shaft, bearing means rotatably supporting said knife shaft and knife, transverse motion means for moving said bearing means, knife shaft and knife transversely of said profile strip, guiding means on said lower end portion of said seesaw frame for guiding said bearing means, knife shaft and knife in movement transversely of said strip, a motor mounted on said upper end portion of said seesaw frame, said motor having a shaft, and a telescopic connecting shaft connecting said shaft of said motor with said knife shaft to drive said knife shaft and knife in rotation while permitting relative movement between said motor and said bearing means, and height positioning means for positioning said bearing means, knife shaft and knife at a lower height during movement of said bearing means knife shaft and knife transversely of said strip in one direction for effecting a cut of said strip and for positioning said bearing means, knife shaft and knife at a higher height during return movement of said bearing means, knife shaft and knife in an opposite direction, said height positioning means comprising means for tilting said seesaw frame about said horizontal axis.

7. Apparatus according to claim 6, in which said means for tilting said seesaw frame about said horizontal axis comprises a pneumatic servo motor connected between said seesaw frame and said main frame.

* * * * *